Dec. 19, 1967 — J. LA RUSSA — 3,358,958

VIBRATION ISOLATOR

Filed April 27, 1966 — 3 Sheets-Sheet 1

INVENTOR
JOSEPH LaRUSSA
BY Pennie Edmonds,
Morton, Taylor and Adams
ATTORNEYS

Dec. 19, 1967     J. LA RUSSA     3,358,958
VIBRATION ISOLATOR

Filed April 27, 1966     3 Sheets-Sheet 2

INVENTOR
JOSEPH LaRUSSA
BY Pennie, Edmonds,
Morton, Taylor and Adams
ATTORNEYS

Dec. 19, 1967     J. LA RUSSA     3,358,958
VIBRATION ISOLATOR

Filed April 27, 1966     3 Sheets-Sheet 3

INVENTOR
JOSEPH LaRUSSA
BY Pennie, Edmonds,
Morton, Taylor and Adams
ATTORNEYS

United States Patent Office 3,358,958
Patented Dec. 19, 1967

3,358,958
VIBRATION ISOLATOR
Joseph La Russa, Crestwood, N.Y., assignor to Farrand Optical Co., Inc., New York, N.Y., a corporation of New York
Filed Apr. 27, 1966, Ser. No. 545,711
5 Claims. (Cl. 248—358)

The present invention relates to vibration isolating apparatus.

It is known to provide means to insulate against vibration a mass such as for example a measuring or detecting instrument, or a piece of radio apparatus. For example, it is common to provide so-called shock mounts for support of an instrument in a vehicle. The vibration insulating means of the prior art of which I am aware, however, are subject to the disadvantage that when constructed to effect insulation against low frequency vibrations they are "soft" in that they permit the mass intended to be isolated to execute large motions with respect to the framework in which that mass is supported and from whose vibrations it is to be isolated.

The present invention provides vibration isolating apparatus which is improved in this respect. In accordance with the invention, the vibration isolating apparatus comprises a plurality of equivalent pendulums having long natural periods of vibration. These pendulums are connected in series and are disposed with their planes of vibration transverse and preferably perpendicular to each other. The resulting structure provides good isolation against horizontal components of vibration in any direction at frequencies above the very low natural frequencies of the equivalent pendulums, without exceeding reasonable dimensions for the structure.

The invention will now be further described in terms of a number of exemplary embodiments with reference to the accompanying drawings in which.

Figure 1:
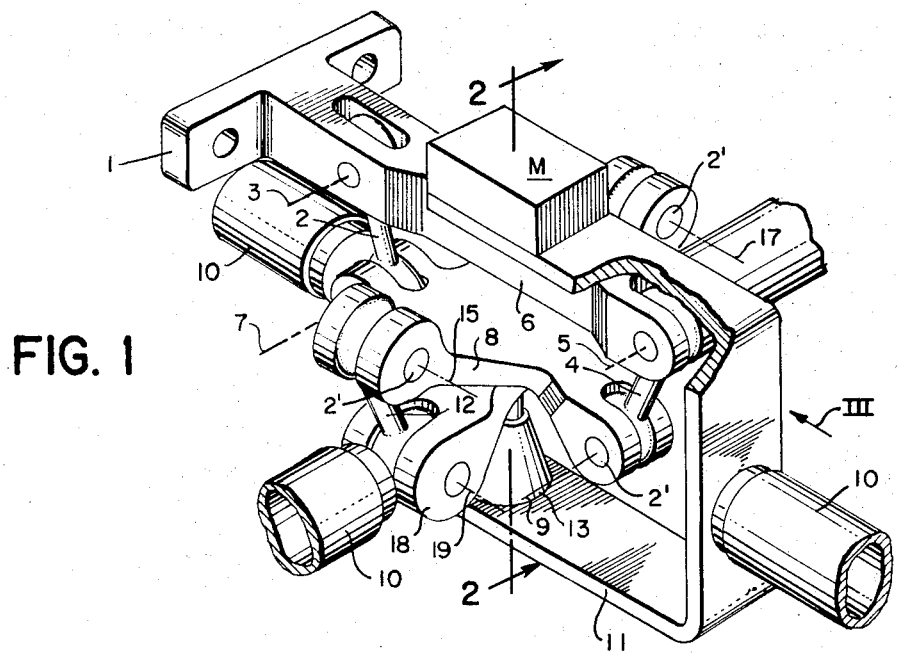
FIG. 1 is an isometric view of one embodiment of the invention.

It has been heretofore proposed to provide by means of a plane four-bar linkage an equivalent pendulum of long natural period. Thus referring to FIG. 8 it has been proposed to provide a four-bar linkage having two bars or links 102 and 104 of the same length $a$ and two bars or links of unequal length, the longer link 106 having a length $g$ and the shorter link 108 having a length $k$. Each of these links is pivoted to the next to form a closed plane quadrilateral which is trapezoidal in the position for which links 102 and 104 make equal angles with links 106 and 108. Link 106, the longer of the two unequal links, is fixed in horizontal position, being provided in practice for example by two fixed spaced horizontal pivots at the same height. A mass 110, preferably heavy compared to the combined mass of the three movable links 102, 104 and 108 (with its stem 112), is affixed to the shorter unequal link 108 as by means of a stem 112 with the center of gravity S of mass 110 on the perpendicular 114 which bisects the link 108 and on the side of link 108 adjacent the link 106. By suitably positioning this center of gravity along that perpendicular, the mass will have a stable point of equilibrium when the linkage assumes the trapezoidal shape shown in FIG. 8 and will therefore return to that position, in an oscillatory manner, when displaced therefrom.

Specifically, for the trapezoidal rest position of the linkage, the perpendicular 114 defines the line along which lies the diameter of what may be termed the inflection circle 116 of the linkage. This circle passes through the intersection at P of the longitudinal axes 118 and 120 of the two equal links 102 and 104, produced, and it has a diameter $w$ determined by the lengths $a$, $g$ and $k$ of the four links. The diameter $w$ of the inflection circle is given as:

$$w = \frac{2a^2 gk}{(g-k)^2 \sqrt{4a^2 - (g-k)^2}}$$

Figure 8:
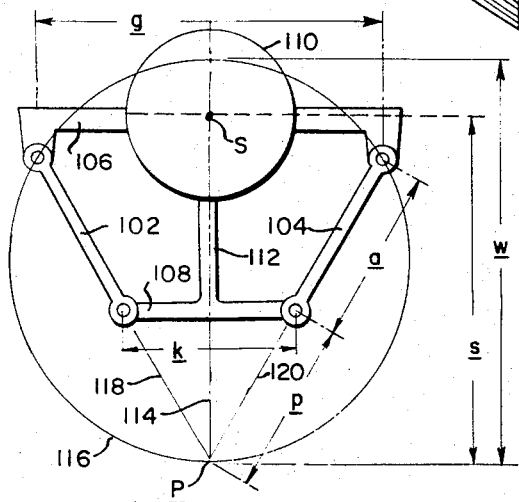
FIGS. 8 and 9 are diagrams useful in explaining the invention.

For stable equilibrium when the linkage is constructed with the shorter unequal link 108 below the longer unequal link 106 as shown in FIG. 8, the center of gravity S of the mass 110 must lie inside the circle 116 for the trapezoidal position of the linkage shown in which the perpendicular 114 is vertical and coincides with the vertical diameter of the inflection circle. If S is thus disposed close to but below the highest point on the circle, then upon oscillation of the linkage, S will move along an arc of a curve which is concave upward and which has its lowest point vertically beneath the highest point on the circle, i.e. on the perpendicular 114 for the rest position of the linkage shown. Hence the position of mass 110 will, for the trapezoidal position of the linkage, be a position of stable equilibrium.

For the special case illustrated in FIG. 8, in which $g = 2k$ so that, by similar triangles, the distance $p$ from the pivot of each of links 102 and 104 with link 108 to the intersection point P of axes 118 and 120 is equal to the length $a$ of links 102 and 104, the inflection circle passes through the pivots at the ends of link 106. This is not however necessary.

Whether $g = 2k$ or not, the length of $l$ of the pendulum to which, for small oscillations, the motion of mass 110 is equivalent, can be shown to be inversely proportional to the difference $w - s$ in which $s$ is the height of the center of gravity S of mass 110 above the polar point P on the inflection circle. Specifically, the length $l$ is given by the relation:

$$l = \frac{r_t^2 - s^2}{w - s}$$

wherein $r_t$ is the radius of gyration of the mass 110 about its center of gravity.

The period of a pendulum is proportional to the square root of its length. Thus by making the difference $w - s$ therein small, the device illustrated in FIG. 8 may as to the movements of mass 110 be made to behave like a pendulum of long length compared to the dimensions of the structure in FIG. 8 and of correspondingly long natural period of vibration. The stem 112 is accordingly made such as to support the mass 110 with its center of gravity slightly below the highest point on the inflection circle, whose diameter and position are fully determined from the lengths of the four links.

For further details on these prior art proposals, reference is made to K. H. Sieker, Getriebe mit Energiespeichern, C. S. Wintersche Verlagshandlung, Flossen, 1954, for example at pages 123 to 129.

In accordance with the present invention, there is provided a combination of two equivalent pendulums of the type described in connection with FIG. 8, the two pendulums being however arranged in series and with their planes of oscillation transverse and preferably at right angles to each other.

Referring to FIG. 1 there is shown a first bar 6 affixed at one end to a bracket 1 which is in turn fastened to the frame of reference against whose vibrations the invention is to provide isolation for a mass indicated at M. The mass M has been shown of small size for clarity of the drawing. If the frame of reference is for example a vehicle, the bracket 1 may be supported therein by means such as a gimbal mounting or equivalent so as to maintain the bar 6 horizontal, both lengthwise and crosswise thereof, notwithstanding changes in attitude of the vehicle.

The bar 6 constitutes in the embodiment of FIG. 1 the longer of the two unequal links of a linkage of the kind described with reference to FIG. 8 and hence corresponds to the link 106 of FIG. 8.

The bar 6 has pivotally connected thereto a first pair of suspension links 2 and 4 of equal length, pivoted to bar 6 so as to permit them to rotate with respect to that bar about parallel axes 3 and 5. These rotations thus occur in planes which are parallel to each other, and which are typically one and the same plane. The links 2 and 4 in turn are pivotally connected to a first suspended link 8 for rotation with respect to the link 8 about axes 7 and 9 which are parallel to the axes 3 and 5. The link 8 is accordingly free to execute oscillatory motion with respect to the bar 6. This motion will include translation of link 8 in a plane perpendicular to the axes 3, 5, 7 and 9.

Figure 2:
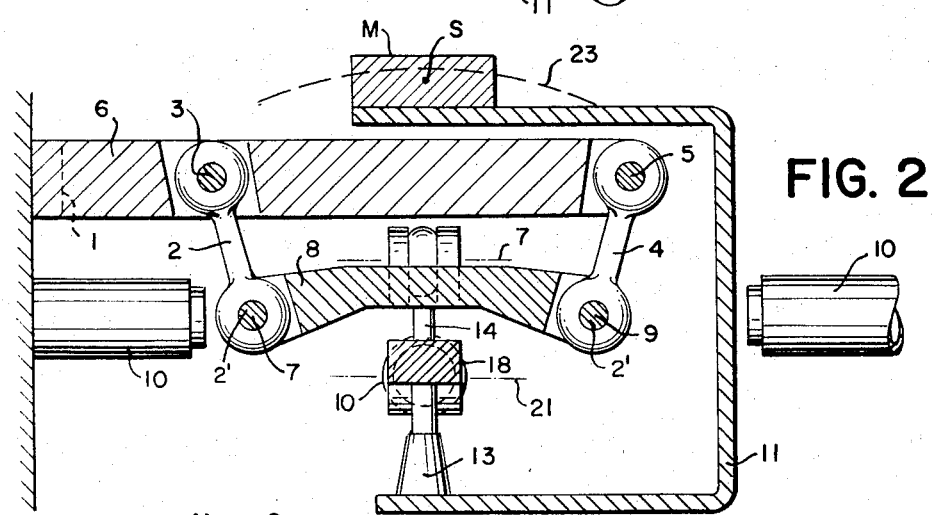
FIG. 2 is a sectional view taken on the section plane identified by the section line 2—2 of FIG. 1.

The links 2 and 4 are of the same length between the pivot points thereof in members 6 and 8. That is, the separation of axes 3 and 7 is the same as the separation of axes 5 and 9. On the other hand, link 6 is longer than is link 8 in respect of links 2 and 4. That is, the separation of axes 3 and 5 is larger than the separation of axes 7 and 9. These relative dimensions are illustrated in FIG. 2. With these relative dimensions, the oscillations of link 8 with respect to link 6 will include rotation about an axis parallel to the axes 3, 5, 7 and 9, as well as the translation previously mentioned.

The four-bar linkage comprising links 2, 4, 6 and 8 supports the mass M to be isolated via a second four-bar linkage comprising links 8, 12, 14 and 18 (FIGS. 1 and 3) and via an arm 11 fixed to link 18 at a pillar 13. The arm 11 is shown in phantom in FIG. 3. The links 12 and 14 are of equal length between their pivotal axes 15 and 17, respectively, in link 8 and their pivotal axes 19 and 21, respectively, in link 18. These four pivotal axes are parallel to each other. They are moreover transverse of and preferably perpendicular to the pivotal axes 3, 5, 7 and 9 of the first four-bar linkage. Link 8 thus has generally the shape of a plate or spider, and includes means defining two pairs of bearing surfaces, the bearing surfaces of each pair defining two parallel axes of rotation. In the particular embodiment shown, these bearing surfaces are the outer cylindrical surfaces of pins 2′, which are engaged by the links 2, 4, 12 and 14. One pair of bearing surfaces defines the axes 7 and 9, and the bearing surfaces of this pair are aligned with each other lengthwise of those axes. The other pair of bearing surfaces defines the axes 15 and 17, and the bearing surfaces of this pair are aligned with each other lengthwise of those axes. Viewed in plan, these four bearing surfaces are disposed at the corners of a rectangle.

With the axes 7 and 9 perpendicular to the axes 15 and 17, mass M is rigid with respect to link 8 as regards motion in planes perpendicular to axes 7 and 9, i.e. in the section plane of FIG. 2. There is shown in FIG. 2 at 23 an arc of the inflection circle of the four-bar linkage 2, 4, 6 and 8, the arc extending a short distance to either side of the highest point on this circle. The arm 11 and pillar 13 are dimensioned to locate the center of gravity S of mass M a short distance below this arc. Consequently, with motion of the links 2, 4, 6 and 8 relative to each other, such as may be produced upon accelerations of link 6 having a horizontal component in the plane of FIG. 2, the center of gravity S of mass M will move, with respect to link 6, along the arc of a curve lying in the plane of FIG. 2 and which is concave upwardly, the position shown for S in FIG. 2 being therefore a position of stable equilibrium.

The circle of inflection whose arc is shown at 23 is determined in accordance with the considerations above set forth with respect to FIG. 8, as applied to the linkage 2, 4, 6 and 8. Thus, if the separations of the axes 3 and 7 and of the axes 5 and 9 are both denoted $a$, if the separation of axes 3 and 5 is denoted $g$ and if the separation of axes 7 and 9 is denoted $k$, the diameter $w$ of the circle of inflection is given by the equation for $w$ hereinabove already set forth in connection with FIG. 8. The location of the circle 23 is completely determined with reference to the linkage 2, 4, 6, 8 and hence with reference to the link 6 by the fact that its vertical diameter lies on the perpendicular bisector of the line segment which in the plane of FIG. 2 joins the axes 7 and 9 when the links 2 and 4 make equal angles with links 6 and 8 and by the fact that its circumference passes through the intersection of the lines which in that plane pass through axes 3 and 7 and through axes 5 and 9, precisely as in the manner already described with reference to FIG. 8. The diameter and location of the circle 23 being thus known, the arm 11 can be dimensioned, in conjunction with the dimensions of the second linkage 8, 12, 14 and 18, to position mass M with its center of gravity S beneath the highest point of that circle.

The linkage 2, 4, 6 and 8 thus provides to the mass M, in conjunction with suitable dimensioning of the linkage 8, 12, 14, 18 and the elements 11 and 13 necessary to locate S below the inflection circle 23, a support equivalent to a long pendulum having a plane of oscillations perpendicular to the axes 3, 5, 7 and 9. The period of this equivalent pendulum can readily be made of the order of a second of time for lengths of a few inches for the links 2, 4, 6 and 8 (i.e. for the separations of the axes 3, 5, 7 and 9), this period being designedly chosen much longer than the period of the vibrations to which the frame of reference, and hence the link 6, is subject.

Figure 3:
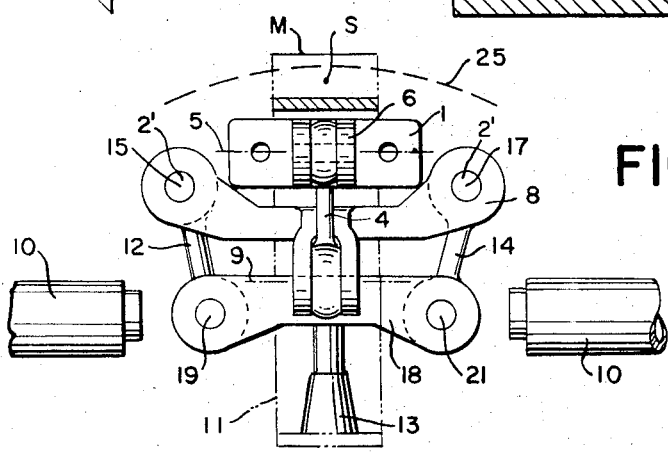
FIG. 3 is a view in elevation looking in the direction of the arrow III in FIG. 1.

Buffers or snubbers may be provided, as indicated at 10, to limit the motions of link 8 with respect to link 6 in the plane of FIG. 2, and the motions of link 18 with respect to link 6 in the perpendicular plane, i.e. that of FIG. 3. These snubbers have a fixed part fastened to structure which is stationary with respect to link 6, and a movable part spaced from but engageable with the link whose motions they are to limit. The snubbers may be of conventional construction, including a spring or other resilient element and a dashpot or the like to limit their restoring motion.

The second four-bar linkage comprising links 8, 12, 14 and 18 is seen in FIG. 3, in which is also shown an arc 25 of the circle of inflection which characterizes that linkage. The center of gravity S of mass M is seen to lie below this arc, so that the mass has stable equilibrium at the location, shown in FIG. 3, for which the links 12 and 14 make equal angles with the links 8 and 18. The circle of inflection to which arc 25 belongs is specified by the length of the links 12, 14 and 18 and of link 8 between the axes 15 and 17 in accordance with the relation set out hereinabove with respect to FIG. 8. Thus, if the separations of axes 15 and 19 and of axes 17 and 21 are both denoted $a$, if the separation of axes 15 and 17 is denoted $g$ and if the separation of axes 19 and 21 is denoted $k$, the diameter $w$ of the inflection circle 25 is given by the equation for $w$ already set out above. The circle 25 is completely located by the fact that its vertical diameter lies on the perpendicular bisector of the line segment joining axes 19 and 21 in a plane perpendicular to those axes and by the fact that the circumference of that circle passes through the intersection of the longitudinal axes of links 12 and 14, i.e. the lines which in the plane just mentioned pass through the axes 15 and 19 on the one hand and the axes 17 and 21 on the other hand. The circle 25 being in determined position with respect to link 8, it is also in determined position with respect to link 6.

By suitable selection of the dimensions for the links of the linkage 8, 12, 14 and 18, i.e. of the dimension $a$, $g$ and $k$ thereof, and notably of the difference $g-k$, the inflection circle for this second four-bar linkage may be given the size and location necessary to position the highest point on that circle above and suitably close to the center of gravity S. In consequence, upon accelerations of link 6 having a horizontal component in planes perpendicular to axes 15, 17, 19 and 21, mass M will move with respect to link 8 along the arc of a curve lying in a plane perpendicular to those axes and which is concave upwardly so that the position shown for S in FIG. 3 is a position of stable equilibrium. That is to say, the second linkage 8, 12, 14, 18 provides to mass M, in conjunction with suitable dimensioning of the first linkage 2, 4, 6, 8 and of the elements 11 and 13 necessary to locate S below the inflection circle 25, a support equivalent to a long pendulum having a plane of oscillations perpendicular to the axes 15, 17, 19 and 21 and hence perpendicular to the plane of oscillations of the equivalent pendulum provided by linkage 2, 4, 6, 8. The period of oscillations of this second equivalent pendulum can, like that of the first, readily be made of the order of a second of time for lengths of a few inches for the links thereof.

The two four-bar linkages may be of the same or of different dimensions and may have the same or different periods of oscillation. They should be preferably so dimensioned that their periods of oscillation both differ widely from the period of the vibrations to which the system will be subject. Their circles of inflection may have like or unlike diameters, and whether of like or unlike diameters those circles may have their highest points at the same distance above the rest position for the center of gravity S of mass M or at different distances above it.

Figure 9:
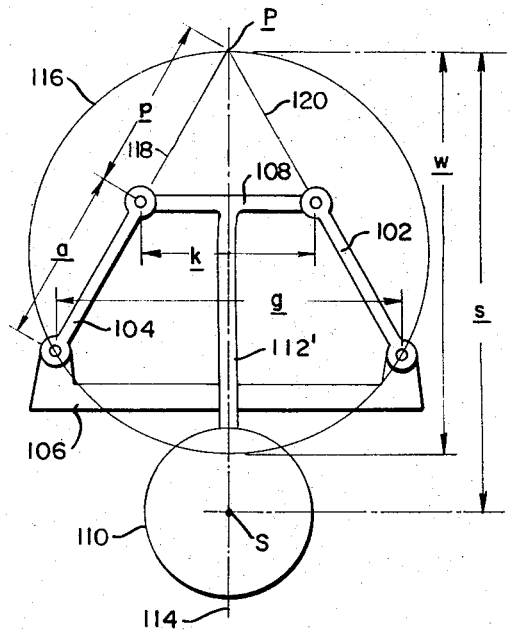

The invention can employ equivalent pendulums having the longer unequal link beneath the shorter one instead of above it, as is the case with the embodiment of FIGS. 1 to 3. FIG. 9 illustrates the prior art proposal for isolation of a mass against vibration in a single plane by means of a four-bar linkage of the type discussed in connection with FIG. 8 but with the shorter unequal link above the longer one instead of below it. The elements of structure of FIG. 9 may be identical with those of FIG. 8 except that the stem 112 of FIG. 8 is replaced in FIG. 9 by a longer stem 112' so as to position the center of gravity S outside the inflection circle. The diameter $w$ of the inflection circle for FIG. 9 is given by the equation for that quantity already hereinabove set out, and the period $l$ of the equivalent pendulum is given by the equation for $l$ already hereinabove set out, except that in applying this equation for $l$ to FIG. 9 the quantities $s$ and $w$ must be taken as negative, $s$ being in absolute magnitude greater than $w$.

Figure 4:
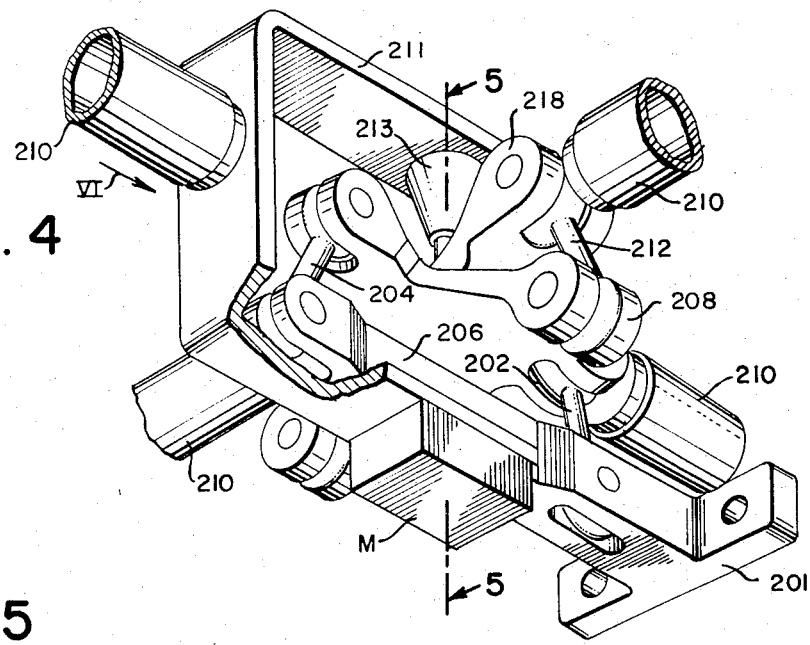
FIG. 4 is an isometric view of another embodiment of the invention.
Figure 5:
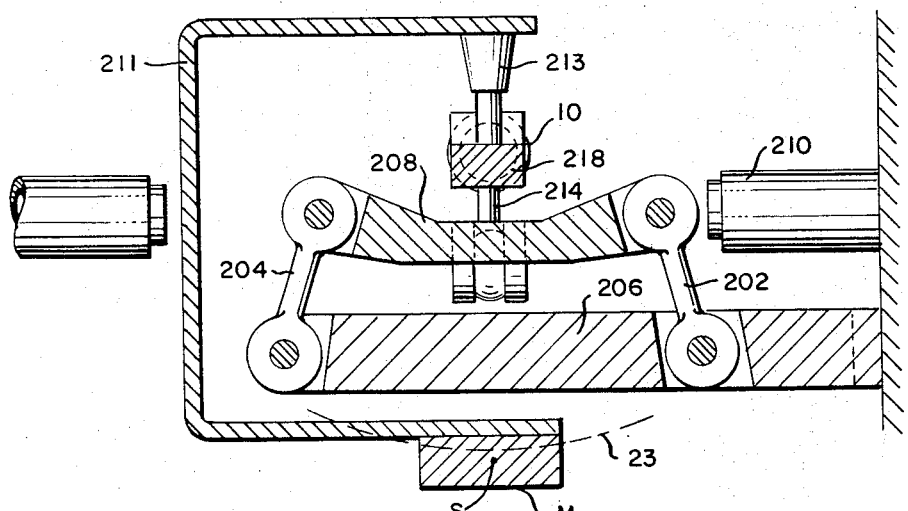
FIG. 5 is a sectional view taken on the section plane identified by the section line 5—5 of FIG. 4.
Figure 6:
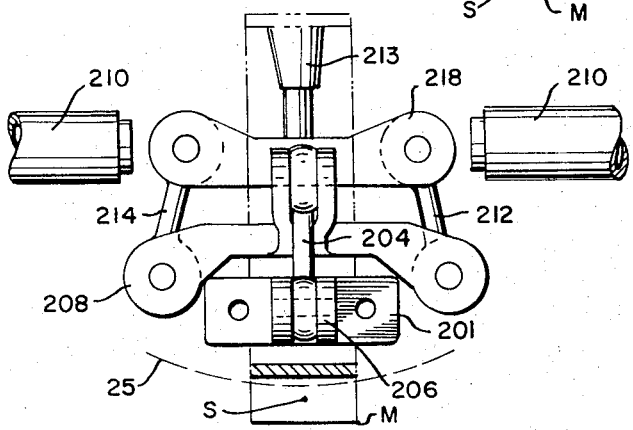
FIG. 6 is a view in elevation looking in the direction of the arrow VI in FIG. 4.

An embodiment of the invention in which the longer unequal link is beneath the shorter one in each of the two four-bar linkages is illustrated in FIGS. 4 to 6 wherein the elements of structure correspond element for element with those shown in FIGS. 1 to 3 and having reference characters smaller by two hundred. Except for arm 211, they may indeed (although they need not) have the same dimensions as those corresponding elements in FIGS. 1 to 3. FIG. 4 is an isometric view from a position beneath and to one side of the embodiment of that figure, whereas FIG. 1 is an isometric view from above and to one side of the embodiment shown in FIG. 1. The only necessary difference between the two embodiments is that in the embodiment of FIGS. 4 to 6, the center of gravity S of the mass M to be isolated must lie below the lowest point of the inflection circle of each of the four bar linkages, i.e. outside the inflection circles, instead of below the highest point on each of those circles and hence inside them. This is shown in FIGS. 5 and 6 with respect to the inflection circles 23 and 25, which may be unchanged in size and position from the corresponding inflection circles shown in FIGS. 2 and 3. Accordingly, the arm 211 is somewhat longer vertically in FIGS. 4 to 6 than it is in FIGS. 1 to 3.

Figure 7:
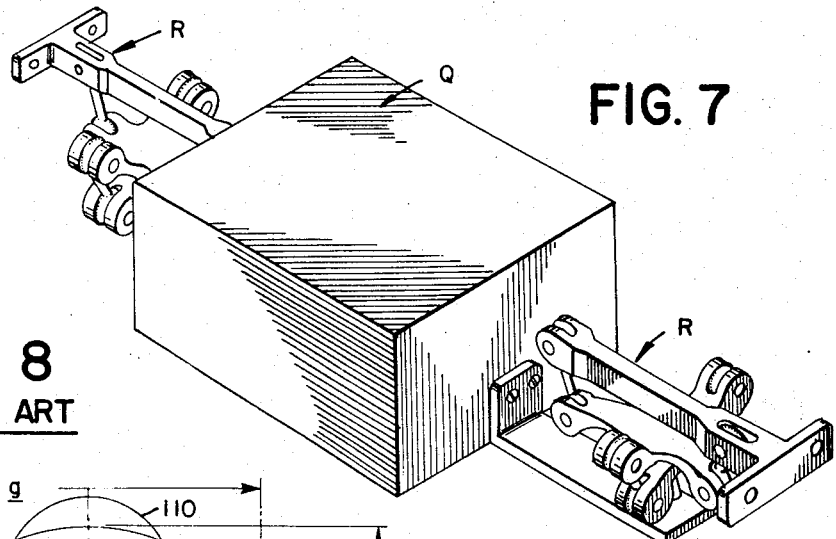
FIG. 7 is an isometric view of still another embodiment of the invention.

FIG. 7 shows still another embodiment of the invention in which a mass Q is suspended from two double linkages generally indicated at R, each of which incorporates the structure shown in FIG. 1 except that the snubbers of FIG. 1 have not been shown in FIG. 7 and except that the arm 11 of FIG. 1 has been modified for affixation to a mass Q between the two assemblies R, which have their links 6 parallel to each other.

While the invention has been described hereinabove in terms of a number of presently preferred embodiments, the invention itself is not limited thereto but rather comprehends all modificaions on and departures from the embodiments described which properly fall within the spirit and scope of the appended claims.

I claim:

1. Vibration isolating apparatus comprising two series-connected four-bar linkages having crossed planes of oscillation, and means to support a mass to be isolated from the second of those linkages with its center of gravity in a position of stable equilibrium as to each of those linkages adjacent the circles of inflection thereof.

2. Vibration isolating apparatus comprising a first pair of equal length links each pivoted to a common support for rotation in parallel planes with respect to that support, a second link pivoted to each link of said first pair, a second pair of equal length links each pivoted to said second link for rotation with respect to said second link in parallel planes transverse of said first-mentioned parallel planes, and a third link pivoted to each link of said second pair.

3. Vibration isolating apparatus according to claim 2 wherein the parallel planes of rotation of the links of said second pair are perpendicular to the parallel planes of rotation of the links of said first pair.

4. Vibration isolating apparatus according to claim 2 wherein the separation of the pivots of the links of said first pair in said second link is smaller than the separation of the pivots in said common support and wherein the separation of the pivots of the links of said second pair in said second link is greater than the separation of the pivots in said third link.

5. Vibration isolating apparatus according to claim 4 including means to support a mass with its center of gravity adjacent each of two points, the first of said points lying on the perpendicular bisector of said second link when the links of said first pair make equal angles with said second link, said bisector being parallel to said first-mentioned parallel planes, said first point being moreover spaced along said perpendicular from the intersection of the axes of the links of said first pair by a distance:

$$\frac{2a^2gk}{(g-k)^2\sqrt{4a^2-(g-k)^2}}$$

wherein $a$ is the length of each of the links of said first pair, $g$ is the separation of the pivots in said support, and $k$ is the separation of the pivots of the links of said first pair in said second link, said second point lying on the perpendicular bisector of said third link when the links of said second pair make equal angles with said third link, said bisector being parallel to said second-mentioned parallel planes, said second point being moreover spaced along the perpendicular bisector of said third link from the intersection of the axes of the links of said second pair by a distance:

$$\frac{2a^2gk}{(g-k)^2\sqrt{4a^2-(g-k)^2}}$$

wherein $a$ is the length of each of the links of said second pair, $g$ is the separation of the pivots of the links of said second pair in said second link, and $k$ is the separation of the pivots of the links of said second pair of said third link.

References Cited
UNITED STATES PATENTS

| | | | |
|---|---|---|---|
| 2,506,095 | 5/1950 | Mantz | 248—358 X |
| 2,704,196 | 3/1955 | Beach | 248—358 |
| 2,717,134 | 9/1955 | Ferber | 248—20 X |
| 3,197,983 | 8/1965 | Ilmer | 248—18 X |

ROY D. FRAZIER, *Primary Examiner.*

F. DOMOTOR, *Assistant Examiner.*